(Model.)
T. A. ANDREWS.
COFFEE AND SPICE MILL.
No. 255,559. Patented Mar. 28, 1882.
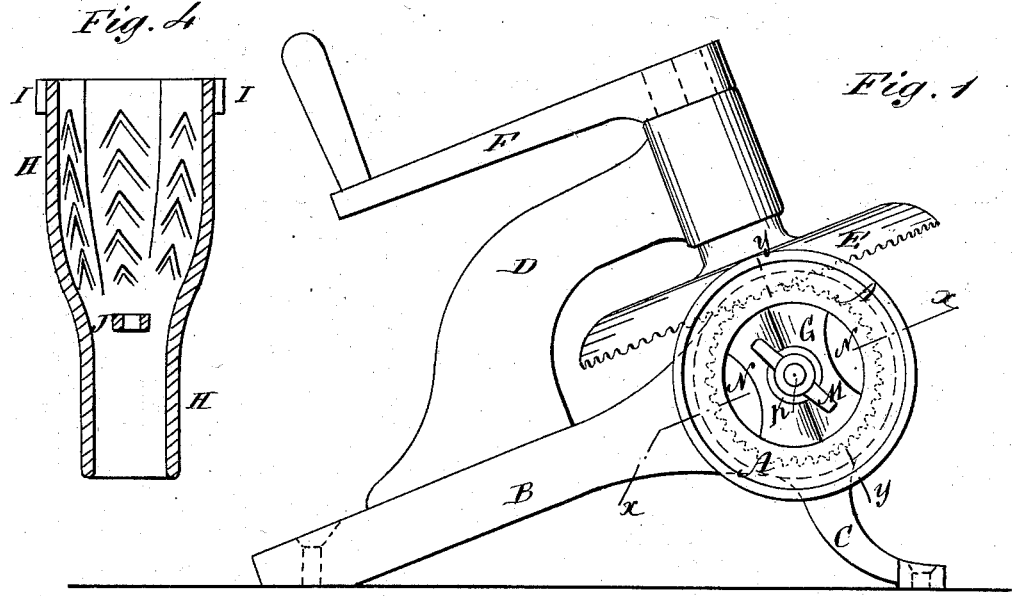
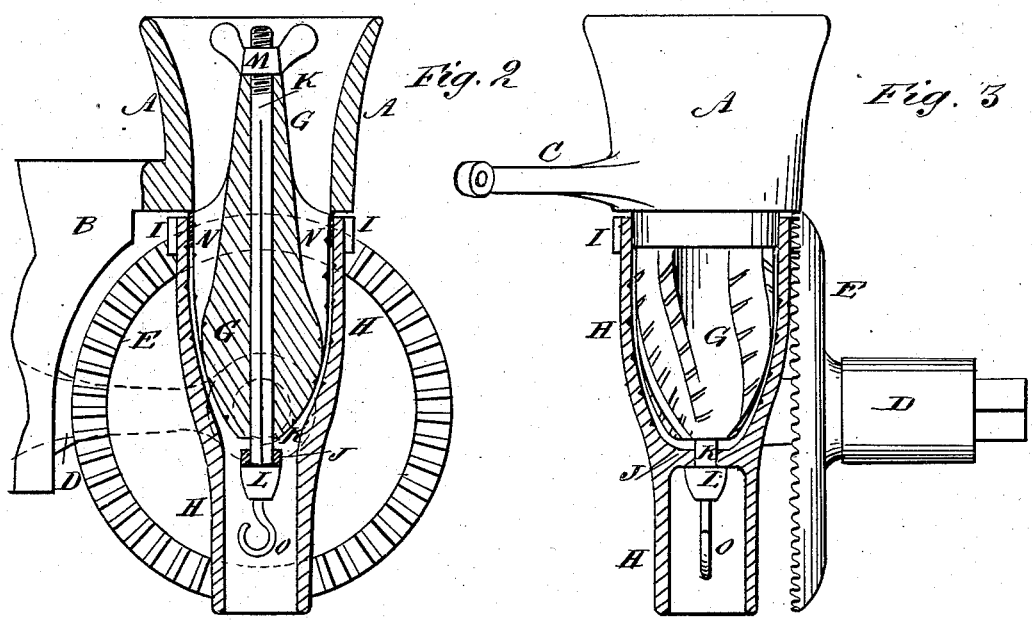
WITNESSES:
C. Neveux
C. Sedgwick
INVENTOR:
T. A. Andrews
BY Munn &Co
ATTORNEYS.

UNITED STATES PATENT OFFICE.

THOMAS A. ANDREWS, OF SEAGOVILLE, TEXAS.

COFFEE AND SPICE MILL.

SPECIFICATION forming part of Letters Patent No. 255,559, dated March 28, 1882.

Application filed June 2, 1881. (Model.)

*To all whom it may concern:*

Be it known that I, THOMAS AUGUSTUS ANDREWS, of Seagoville, in the county of Dallas and State of Texas, have invented a new and useful Improvement in Coffee and Spice Mills, of which the following is a full, clear, and exact description.

In the accompanying drawings, Figure 1 is a plan view of my improvement. Fig. 2 is a sectional elevation of the same, taken through the line $x\ x$, Fig. 1. Fig. 3 is a side elevation of the same, partly in section, through the line $y\ y$, Fig. 1. Fig. 4 is a sectional elevation of the outer burr.

Similar letters of reference indicate corresponding parts.

The object of this invention is to facilitate the grinding of coffee, spices, and other substances, and also the cleaning of the mill after grinding one substance to prepare it for grinding a different substance.

The invention consists in constructing a coffee and spice mill with a hopper having arms for attaching the mill to a wall and for supporting the gear-wheel formed upon it, an inner cone-burr formed solid with the hopper, an outer shell-burr suspended from and swiveled to the inner burr by a cross-bar, rod, and hand-nut, and the gear-wheels and crank for rotating the outer burr, all constructed and operating as will be hereinafter fully described.

A represents the hopper of the mill, which is cast with a plate or wide arm, B, upon one side, having the rear side of its outer end beveled to rest against a wall or other support, and having holes through the said beveled end to receive the screws that fasten it in place.

Upon the rear side of the hopper A is cast an arm, C, curved from the plate B to rest against a wall or other support, and having a hole through it to receive a screw for securing it in place. Upon the forward side of the plate or arm B is cast an arm, D, which projects in front of the hopper A, and has a bearing in its end to receive the journal of a large gear-wheel, E. The end of the journal of the gear-wheel E projects and is squared to receive the crank F, by means of which the mill is operated.

Upon the lower part of the hopper A is cast the inner burr, G, the upper end of which projects in conical form nearly to the top of the said hopper A. The lower part of the burr G is made acorn shape and has a dress formed upon its outer surface to grind the substance passing through the mill against the dress formed upon the inner surface of the outer or shell burr, H. The upper part of the outer burr, H, is formed to fit upon the inner burr, G, and its lower part is made smaller or is tapered to serve as a spout to discharge the ground substance.

Upon the upper part of the outer surface of the burr H is formed, or to it is attached, a gear-wheel, I, the teeth of which mesh into the teeth of the gear-wheel E, so that the outer burr, H, will be rotated by the revolution of the said gear-wheel E. Upon the interior of the outer burr, H, a little below the lower end of the inner burr, G, is cast a cross-bar, J, which has a hole through its center to receive the rod K. The cross-bar J rests upon a head or shoulder, L, formed upon the lower end of the rod K. The rod K passes up through a perforation formed through the center of the inner burr, G, and has a screw-thread formed upon its upper end to receive the hand-nut M, which rests upon the upper end of the said inner burr, G. By this construction the outer burr, H, is supported from and is swiveled to the inner burr, G. By this construction, also, the mill can be adjusted to grind fine or coarse by turning the nut M. By unscrewing the hand-nut M the rod K can be taken out and the outer burr, H, removed, so that the mill can be thoroughly cleaned when it is desired to grind a different substance.

In opposite sides of the part of the inner burr, G, that passes through the lower end of the hopper A and enters the upper end of the outer burr, H, are formed grooves N to serve as apertures or passages for the substance placed in the said hopper A to pass into the space between the inner burr, G, and the outer burr, H, and be ground. Upon the lower end or head of the rod K is formed a hook, O, from which a cup can be suspended to receive the ground substance as it flows from the mill.

Having thus described my invention, what I claim as new, and desire to secure by Letters Patent, is—

1. A coffee and spice mill constructed substantially as herein shown and described, consisting of the hopper A, having arms B C D cast upon it, the inner stationary burr, G, the outer rotary burr, H, the supporting-rod K, the gear-wheels I E, and the crank F, as set forth.

2. In a coffee and spice mill, the combination, with the hopper A, provided with the stationary inner burr, G, of the rotating outer burr, H, cross-bar J, and the suspending-rod K, substantially as herein shown and described, whereby the outer burr is supported from and swiveled to the inner burr, as set forth.

3. In a coffee and spice mill, the combination, with the hopper A, provided with the stationary inner burr, G, having a central orifice, of the outer rotating burr, H, having cross-bar J, rod K, having shoulder L, and screw-threaded at its upper end, thumb-nut M, and hook O, substantially as described, and for the purposes set forth.

THOMAS A. ANDREWS.

Witnesses:
E. H. RAINS,
JAMES CRAVENS.